United States Patent
Jaskiewicz

(10) Patent No.: US 10,815,721 B2
(45) Date of Patent: Oct. 27, 2020

(54) ENTRYWAY SEALING SPACER

(71) Applicant: Endura Products, Inc., Colfax, NC (US)

(72) Inventor: Tomasz Jaskiewicz, Oak Ridge, NC (US)

(73) Assignee: Endura Products, LLC, Colfax, NC (US)

( * ) Notice: Subject to any disclaimer, the term of this patent is extended or adjusted under 35 U.S.C. 154(b) by 189 days.

(21) Appl. No.: 15/943,781

(22) Filed: Apr. 3, 2018

(65) Prior Publication Data
US 2018/0305975 A1 Oct. 25, 2018

Related U.S. Application Data

(60) Provisional application No. 62/488,094, filed on Apr. 21, 2017.

(51) Int. Cl.
| | |
|---|---|
| *E06B 3/96* | (2006.01) |
| *E06B 7/14* | (2006.01) |
| *E06B 7/23* | (2006.01) |
| *E06B 1/70* | (2006.01) |

(52) U.S. Cl.
CPC .......... *E06B 3/9616* (2013.01); *E06B 3/9632* (2013.01); *E06B 7/14* (2013.01); *E06B 7/2305* (2013.01); *E06B 1/70* (2013.01)

(58) Field of Classification Search
CPC ..... E06B 1/70; E06B 1/62; E06B 7/14; E06B 7/16; E06B 7/2316; E06B 2001/628; E06B 2001/707; E06B 3/9632
See application file for complete search history.

(56) References Cited

U.S. PATENT DOCUMENTS

| | | | | |
|---|---|---|---|---|
| 1,912,255 A | * | 5/1933 | Clark | F25D 23/087 49/493.1 |
| 3,542,382 A | * | 11/1970 | Hagmann | F16J 15/123 277/649 |
| 3,851,420 A | | 12/1974 | Tibbetts | |
| 4,111,583 A | | 9/1978 | Brady | |
| 4,476,653 A | | 10/1984 | Speer et al. | |
| 4,858,385 A | * | 8/1989 | Bright | B60J 10/24 49/490.1 |
| 5,136,814 A | | 8/1992 | Headrick | |
| 5,179,804 A | | 1/1993 | Young | |
| 5,364,109 A | | 11/1994 | Sihon | |
| 5,517,788 A | * | 5/1996 | McGough | E06B 1/70 49/467 |

(Continued)

FOREIGN PATENT DOCUMENTS

| | | |
|---|---|---|
| CA | 2501307 | 4/2004 |
| CA | 2500143 | 9/2005 |

(Continued)

*Primary Examiner* — Justin B Rephann
(74) *Attorney, Agent, or Firm* — Womble Bond Dickinson (US) LLP

(57) ABSTRACT

A gasket for an entryway is described that includes a compliant sealing portion having an uncompressed gasket thickness and a less compliant compression control portion having opposing exposed surfaces. A perimeter of the less compliant compression control portion is surrounded by the compliant sealing portion. A thickness of the less compliant compression control portion is less than the uncompressed gasket thickness.

15 Claims, 4 Drawing Sheets

(56) References Cited

U.S. PATENT DOCUMENTS

| | | | |
|---|---|---|---|
| 5,524,404 A * | 6/1996 | Lahaye | E06B 3/5427 52/235 |
| 5,943,825 A * | 8/1999 | Procton | E06B 1/70 49/469 |
| 6,006,375 A | 12/1999 | Carr | |
| 6,030,694 A | 2/2000 | Dolan et al. | |
| 6,219,971 B1 | 4/2001 | Headrick | |
| 6,484,446 B2 | 11/2002 | Young | |
| 6,637,158 B2 | 10/2003 | Bennett | |
| 6,763,639 B2 | 7/2004 | Bennett et al. | |
| 6,789,358 B2 | 9/2004 | Procton et al. | |
| 6,789,359 B2 | 9/2004 | Bauman et al. | |
| 6,845,983 B1 * | 1/2005 | Suggs | F16J 15/064 277/314 |
| 7,263,808 B2 | 9/2007 | Massey et al. | |
| 7,600,346 B2 | 10/2009 | Meeks | |
| 7,669,369 B2 | 3/2010 | Henry et al. | |
| 7,775,011 B2 | 8/2010 | Backzuk et al. | |
| 7,874,106 B2 | 1/2011 | Pangburn et al. | |
| 7,877,940 B2 | 2/2011 | Meeks et al. | |
| 8,522,483 B2 | 9/2013 | Van Camp et al. | |
| 8,567,128 B2 | 10/2013 | Van Camp et al. | |
| 8,857,107 B1 | 10/2014 | Key | |
| 9,624,716 B2 | 4/2017 | Endura Products | |
| 2002/0078641 A1 | 6/2002 | Procton et al. | |
| 2002/0129557 A1 * | 9/2002 | Young | E06B 1/70 49/468 |
| 2002/0194787 A1 | 12/2002 | Bennett | |
| 2003/0005644 A1 | 1/2003 | Reithmeyer et al. | |
| 2003/0106269 A1 | 6/2003 | Bauman et al. | |
| 2003/0230387 A1 | 12/2003 | Smith | |
| 2005/0198911 A1 | 9/2005 | Baczuk et al. | |
| 2006/0119050 A1 * | 6/2006 | Tripathy | F16J 15/0825 277/592 |
| 2006/0150521 A1 * | 7/2006 | Henry | E06B 1/70 49/471 |
| 2006/0174545 A1 | 8/2006 | Young | |
| 2007/0205566 A1 * | 9/2007 | Ragsdale | F16J 15/122 277/628 |
| 2007/0227076 A1 | 10/2007 | Braun | |
| 2007/0266663 A1 | 11/2007 | Hopkins | |
| 2008/0222961 A1 | 9/2008 | Meeks | |
| 2008/0229669 A1 | 9/2008 | Abdollahzadeh et al. | |
| 2009/0025299 A1 * | 1/2009 | Meeks | E06B 1/62 49/469 |
| 2009/0313900 A1 * | 12/2009 | Foster | E06B 7/231 49/70 |
| 2010/0077669 A1 | 4/2010 | Ruediger | |
| 2010/0162644 A1 | 7/2010 | Campbell et al. | |
| 2010/0307079 A1 | 12/2010 | Baczuk et al. | |
| 2013/0199100 A1 * | 8/2013 | Van Camp | E06B 7/232 49/468 |
| 2016/0340970 A1 | 11/2016 | Mitchell et al. | |

FOREIGN PATENT DOCUMENTS

| | | |
|---|---|---|
| DE | 102012218035 | 4/2014 |
| EP | 2543810 | 7/2012 |
| GB | 2147647 | 10/1984 |

\* cited by examiner

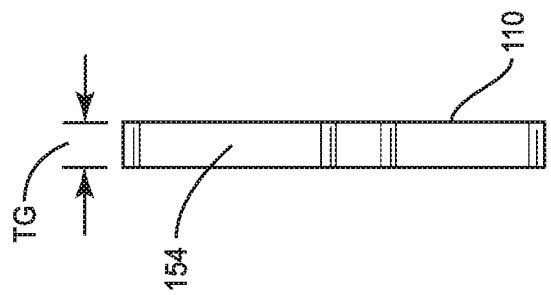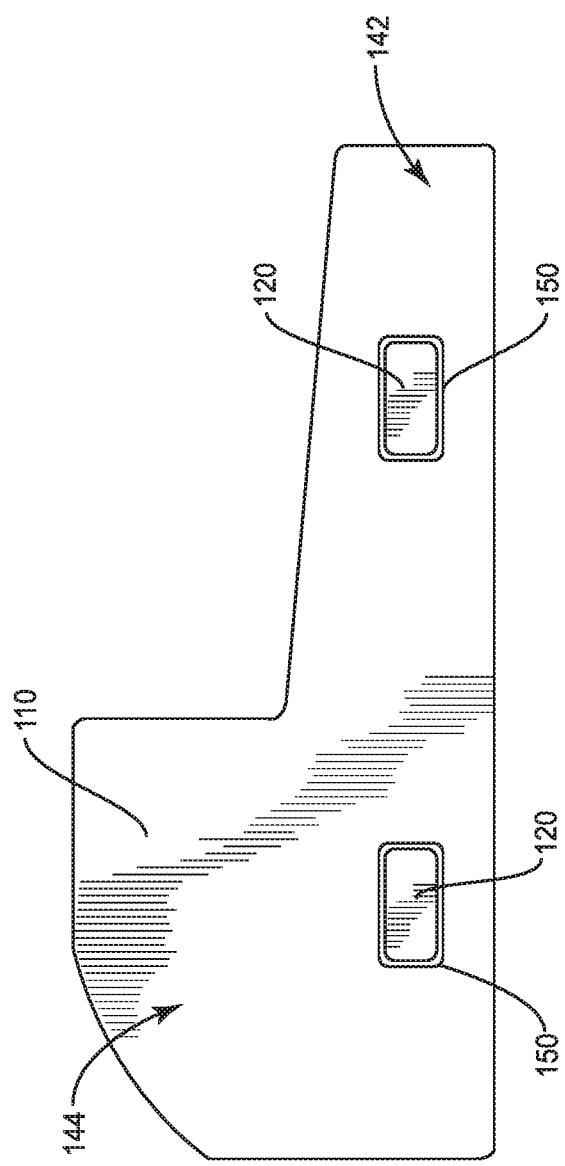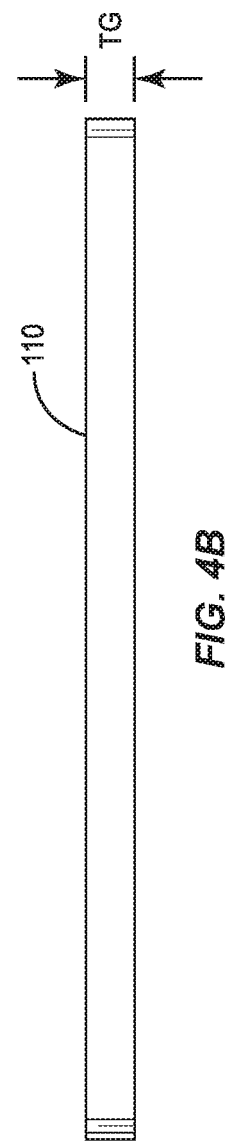

ENTRYWAY SEALING SPACER

PRIORITY

The present application claims priority to provisional application Ser. 62/488,094 filed on Apr. 21, 2017.

RELATED DOCUMENTS

The present disclosure is related to and provides alternative embodiments to the disclosure found in U.S. Pat. No. 9,624,716, issued Apr. 18, 2017, the contents of which are incorporated herein in their entirety.

FIELD OF THE DISCLOSURE

The present disclosure is directed to entryways and door unit assemblies that define openings for ingress and egress from a building. Specifically, the present disclosure is directed to components for sealing between components of an entryway.

BACKGROUND

Homeowners and other property owners are well aware of the damage that can be caused by water that is allowed to pass through, around, or remain idle within an entryway. Unwanted water that finds its way between gaps can lead to wood rot and structural degradation. Over time the gaps may grow as components shift, exacerbating the problem of water entry. Eventually the structural integrity of the door unit assembly may be compromised, requiring full replacement.

As can be appreciated, gaps may occur wherever two materials or two elements are brought together. For example, a gap may occur between a threshold and a side jamb of an entryway. Other gaps may occur where a mullion joins a threshold.

Presently, the most common method of sealing these gaps requires the proper and sufficient application of caulk where two hard surfaces meet. Abutting hard surfaces rarely form a water resistant seal themselves, and a seal only results when malleable caulk is provided therebetween.

In certain locations, sealing gaskets have been used. The effectiveness of these sealing gaskets, however, can be reduced by over-compression or under-compression that results from the variables of the installation process. The effectiveness of these sealing gaskets also can be limited by high wear rates or by using materials that may lose their initial elasticity, resulting in hardening of the gasket material.

Therefore, there is a need for a device that seals between entryway components under the proper degree of compression.

SUMMARY

According to one embodiment of the present disclosure, a gasket is described that includes a compliant sealing portion having an uncompressed gasket thickness and a less compliant compression control portion having opposing exposed surfaces. A perimeter of the less compliant compression control portion is surrounded by the compliant sealing portion. A thickness of the less compliant compression control portion is less than the uncompressed gasket thickness.

According to another embodiment, the present disclosure provides an entryway sealing spacer including a gasket made from a compressible material with a first durometer. The gasket comprises an uncompressed gasket thickness and at least one aperture extending through a thickness of the gasket. The sealing spacer also includes at least one insert positioned within the at least one aperture. The at least one insert has a second durometer, the second durometer being harder than the first durometer. The at least one insert has an insert thickness, the insert thickness is less than the uncompressed gasket thickness, and the at least one insert is capable of fitting entirely within the at least one aperture.

According to another embodiment of the present disclosure, an entryway is described that includes two entryway components selected from the group consisting of a side jamb, a header, a mullion, a door sill, an astragal, and a threshold cap. The entry also includes an entryway sealing spacer gasket disposed between the two entryway components. The entryway sealing spacer may include a gasket made from a compressible material with a first durometer. The gasket may include an uncompressed gasket thickness and at least one aperture extending through a thickness of the gasket. The sealing spacer can also include at least one insert positioned within the at least one aperture. The at least one insert has a second durometer, the second durometer being harder than the first durometer. The at least one insert has an insert thickness, the insert thickness is less than the uncompressed gasket thickness, and the at least one insert is capable of fitting entirely within the at least one aperture.

A further embodiment of the present disclosure includes a method of controlling and sealing a gap between two entryway components. The method includes positioning an entryway sealing spacer between two adjacent entryway components and fastening the two adjacent entryway components together such that a gasket of the sealing spacer is compressed and each of the two adjacent entryway components abuts at least one insert of the sealing spacer.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

BRIEF DESCRIPTION OF THE DRAWINGS

FIGS. 4A-4C are front, bottom, and exterior end views of the entryway sealing spacer according to FIG. 1.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

An embodiment of the present disclosure includes a sealing spacer that includes a gasket made from a relatively soft durometer elastomer, which is compressed when placed between a door sill and a frame, and the door sill and the frame are then fastened together. The compression or compliance of the gasket provides conformance to the adjoining entryway components, providing a seal against moisture penetration. In one embodiment, less compliant inserts of a harder durometer, which are thinner than the gasket, are placed in apertures in the gasket. These inserts resist compression during assembly of the entryway, thus limiting the compression of the more compliant or softer gasket. Limiting compression allows sealing while simultaneously controlling compression against adjustable threshold cap components.

Figure 1:
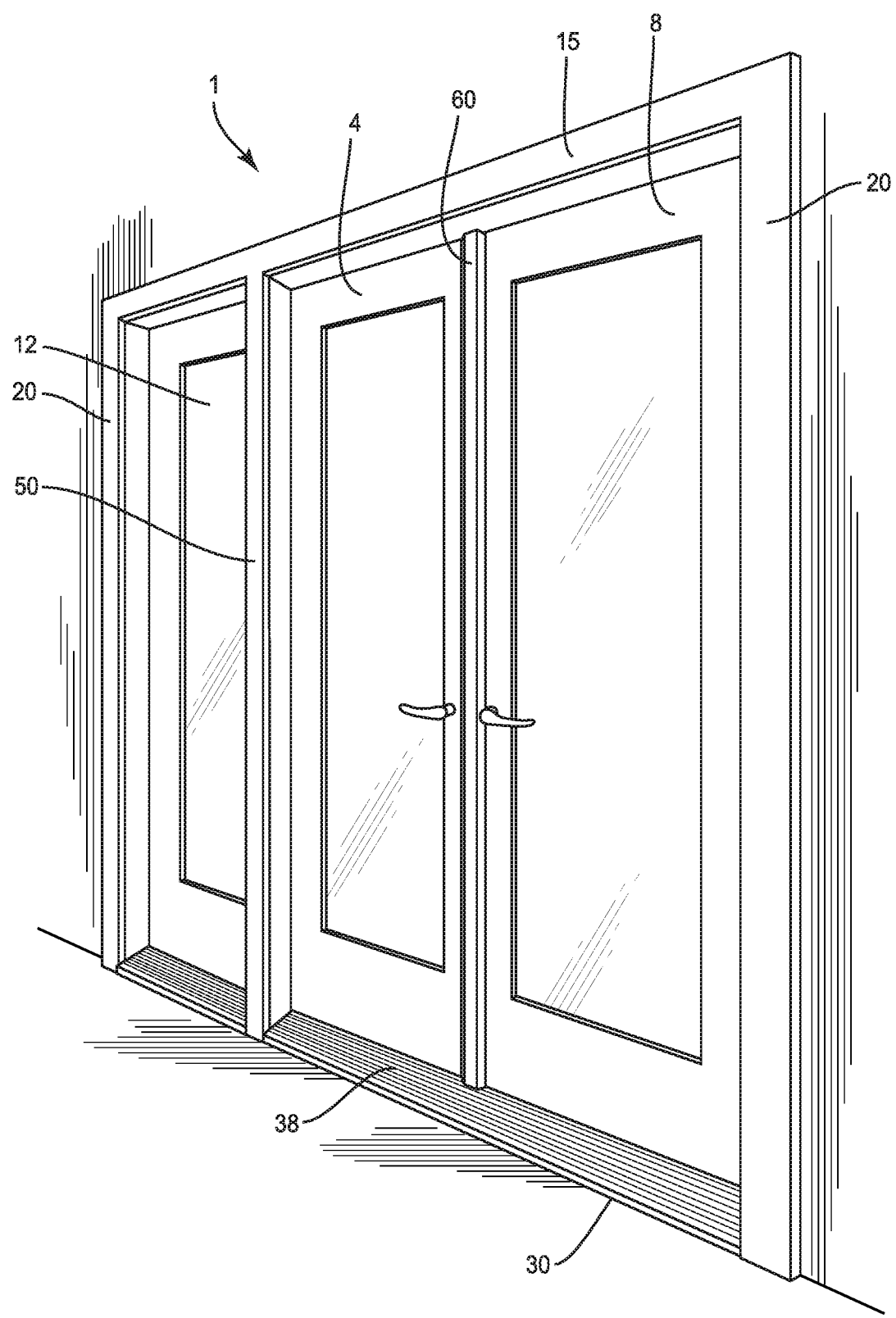
FIG. 1 is an entryway suitable for including one or more entryway sealing spacers according to embodiments of the present disclosure.

FIG. 1 schematically illustrates an entryway 1 having several portions that may benefit from aspects of the present disclosure. The illustrated entryway 1 includes a French door arrangement with a first door panel 4 and a second door panel 8. The entryway 1 is also shown with a sidelight 12. The top of the entryway 1 includes a header 15, and the edges of the entryway 1 are defined by side jambs 20. A door sill 30 extends along the bottom of the entryway 1. The sidelight 12 is separated from the door opening by a mullion 50 that extends upward from the door sill 30. The configuration of the entryway 1 shown in FIG. 1 is provided as an example only and is not intended to limit the scope of this disclosure. Therefore, the entryway 1 may include a single door panel or a plurality of door panels. A plurality of door panels may be separated by movable astragals or by fixed mullions. The entryway 1 may include a single sidelight 12, a sidelight 12 on each opposite side of the door panel(s), or no sidelight at all.

Figure 2:
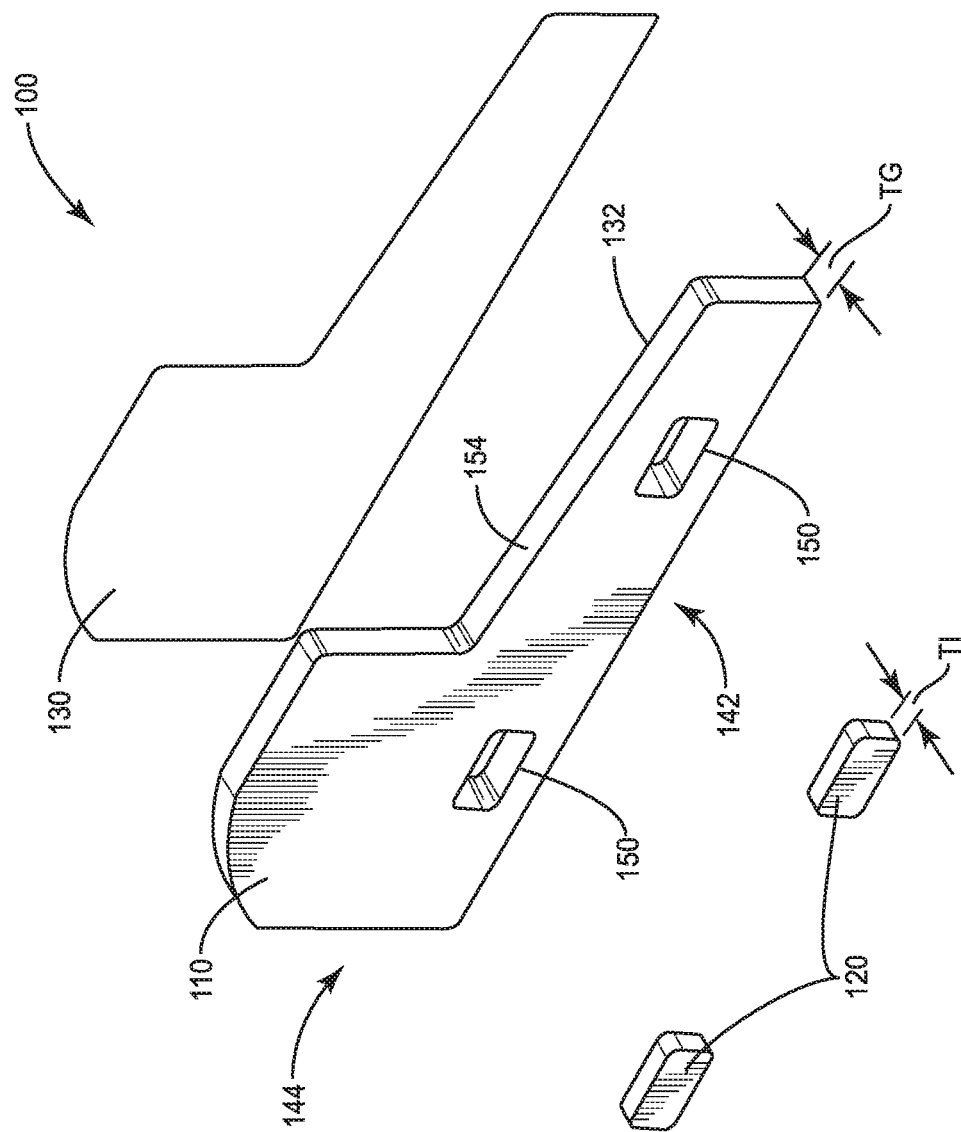
FIG. 2 is an exploded perspective view of an entryway sealing spacer according to an embodiment of the present disclosure.

FIG. 2 shows an exploded view of a sealing spacer 100 according to a first embodiment of the present disclosure. The sealing spacer 100 is configured to form a seal between adjacent components of the entryway 1. The sealing spacer 100 of the illustrated embodiment may be particularly suitable for providing a seal between an end of the door sill 30 (FIG. 1) and an adjacent side jamb 20 (FIG. 1). The concepts and features of the sealing spacer 100, as described in more detail below, may be similarly suitable for filling the gaps between other pairs of adjacent entryway components, including the door sill 30, the side jambs 20, the mullion 50, threshold caps, portions of the astragal 60 (FIG. 1), or even the header 15.

As should be understood, the sealing spacer 100 of the illustrated embodiment in FIG. 2 is intended to substantially fill the gap between an end of the door sill 30 (FIG. 1) and the side jamb 20 (FIG. 1) to minimize water and air infiltration through the gap.

Figure 3:
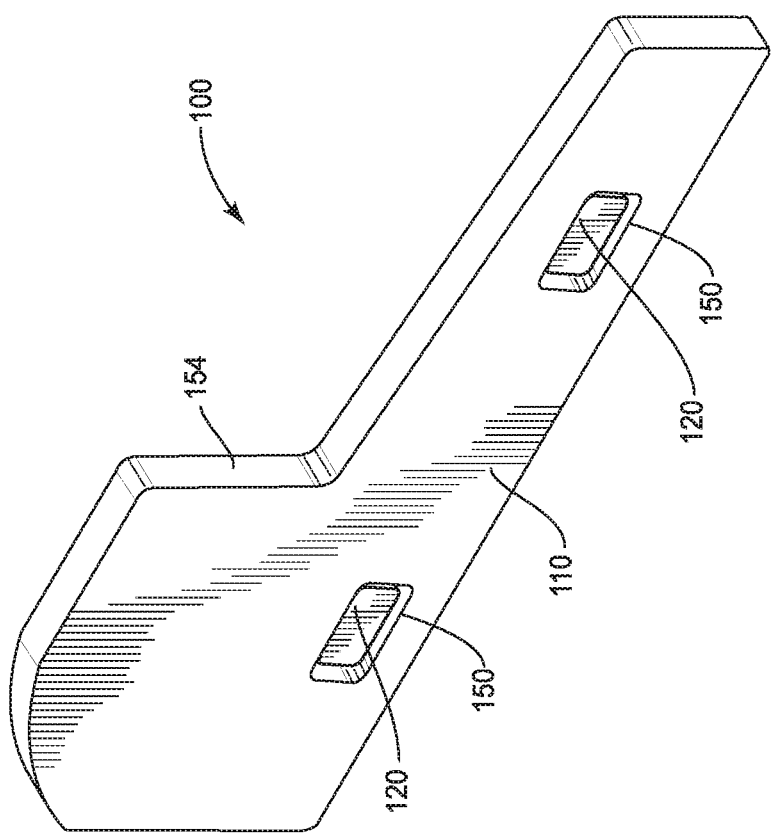
FIG. 3 is a isometric view of the entryway sealing spacer of FIG. 2.

As shown in FIGS. 2-4, the sealing spacer 100 includes a gasket 110 configured to be compressed to fill and seal a respective gap or space between entryway components. The sealing spacer 100 also includes at least one insert 120 provided to function as a compression control element that is used to define the magnitude of the gap between entryway components, such as the door sill 30 and the side jamb 20 (FIG. 1). Prior to installation, the sealing spacer 100 may also include a backing layer 130 configured to be removably attached to a rear surface of the gasket 110 for protecting a layer of adhesive 132 that may be used to mount the sealing spacer 100 to one of the entryway components, such as the side jamb 20.

Each gasket 110 may be made from a relatively compressible material such as foam, rubber, silicon, or other known compressible materials that have a relatively soft durometer and that can form a seal between relatively hard surfaces. As understood by one of ordinary skill in the art, the durometer is a unit of measure applicable for describing the hardness of a material. The material for the gasket 110 may be selected based on a combination of factors, including cost, durability, tear resistance, resiliency, an ability to avoid a permanent set shape, and other factors. In one embodiment, the gasket 110 may be a rubber material selected from neoprene, ethylene propylene diene monomer (EPDM), styrene-butadiene rubber (SBR), or combinations thereof. In one embodiment, the gasket 110 is made from a blend of neoprene, EPDM, and SBR that is formed to have a density of approximately 5-15 pounds per cubic foot. The proposed embodiment of the gasket 110 is compressible, and has good chemical stability, maintains flexibility over a wide temperature range, and has good abrasion resistance.

The gasket 110 (and the sealing spacer 100 as a whole) may have an overall peripheral shape that approximates with the profile of the door sill 30 (FIG. 1). The corresponding shapes between the gasket periphery and the door sill profile helps to ensure that the gasket seals the entire perimeter of the door sill.

As illustrated in FIG. 2, the gasket 110 may be considered as having a deck portion 142 to be positioned at the end of the door sill 30 at a portion of the door sill 30 generally corresponding with a deck 38 (FIG. 1). The gasket 110 may also be considered as having a cap portion 144 positioned at the end of the door sill 30 generally corresponding with the portion of the door sill 30 positioned below a closed door panel(s) 4, 8 (FIG. 1).

The gasket 110 may have an uncompressed gasket thickness TG. While TG could vary at different portions of the gasket 110, it may be preferred that the uncompressed gasket thickness TG is substantially uniform, as shown in FIGS. 4B and 4C.

As shown in FIG. 2, the gasket 110 includes one or more apertures 150 passing through the gasket 110 along the thickness direction. The quantity, size, and shape of the apertures 150 are not particularly limited. When a plurality of apertures 150 are present, the apertures may have the same or different shapes and sizes with respect to one other. Each of the apertures 150 may be spaced from a peripheral edge 154 of the gasket 110 by a sufficient margin to leave sufficient gasket material to form a seal. The apertures 150 should be positioned within the peripheral edge 154 of the gasket 110 at locations corresponding with contact points with a respective entryway component. The apertures 150 may be distributed within the peripheral edge 154 of the gasket 110 to distribute the compressive forces between the opposing entryway components on either side of the gasket 110.

An insert 120 may be positioned within each of the one or more apertures 150 within the gasket 110. Each insert 120 can be constructed of a less compressible, harder durometer material such as rigid polymers like ABS or polyurethane (PU). In one embodiment, high density polyurethane having a density of about 30-50 pounds per cubic foot may be appropriate. The inserts 120 may be sized and shaped to fit closely within respective apertures 150. In one embodiment, each of the apertures 150 are similarly sized and shaped with respect to one another, allowing the inserts 120 to be substantially similarly sized and shaped with respect to one another as well. This illustrated embodiment may reduce the cost of the sealing spacer 100 by minimizing the number of unique pieces, and correspondingly reducing assembly complexity.

Each insert 120 has a thickness TI that is less than the uncompressed gasket thickness TG of the gasket 110. Therefore, the insert 120 is able to fit substantially entirely within a respective aperture 150 of the gasket 110. The inserts 120 do not extend along the faces of the gasket 110 beyond the boundary of each aperture 150. Any reference line parallel with the thickness direction that passes through the sealing spacer 100, with the backing layer 130 removed, would pass through only one of the gasket material and the insert material.

As a result of the relative thicknesses, the inserts 120 provide a compression control feature for the sealing spacer 100. The inserts 120 are configured to have a first exposed distal end configured to abut a first entryway component, e.g. the door sill 30, and a second exposed distal end configured to abut a second entryway component, e.g. the side jamb 20, to define a width of the gap between the entryway components. This in effect provides a control on the degree of maximum compression of the gasket 110 to help prevent over-compression, which can have negative effects on the seal adjacent to the end of the door sill 30.

The illustrated embodiment of FIGS. 2-4 suggests that the inserts 120 may be removable from the apertures 150 of the gasket 110. Forming the sealing spacer 100 as substantially one piece is also contemplated, where the inserts 120 are integrated with the gasket 110 to result in a softer portion surrounding the periphery of one or more harder portions.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A gasket, comprising
    a compliant sealing portion having an uncompressed gasket thickness, the compliant sealing portion configured to engage an end of a door sill to form a seal therewith; and
    a compliant compression control portion having opposing exposed surfaces, the opposing exposed surfaces configured to abut components engaged with the gasket, the compliant compression control portion being less compliant than the compliant sealing portion,
    wherein a perimeter of the compliant compression control portion is surrounded by the compliant sealing portion, and
    wherein a thickness of the compliant compression control portion is less than the uncompressed gasket thickness.

2. The gasket of claim 1, wherein the compliant sealing portion has a perimeter shape substantially similar to a profile of the door sill.

3. The gasket of claim 2, wherein the compliant sealing portion comprises a deck region and a threshold cap region.

4. The gasket of claim 1, wherein the compliant compression control portion comprises at least two inserts disposed within the compliant sealing portion.

5. The gasket of claim 1, further comprising an adhesive layer applied to at least some of the compliant sealing portion.

6. The gasket of claim 1, wherein the compliant sealing portion and the compliant compression control portion do not overlap along a thickness direction of the gasket, the thickness direction being orthogonal to the opposing exposed surfaces of the compliant compression control portion.

7. An entryway sealing spacer, comprising:
    a gasket made from a compressible material with a first durometer, the gasket comprising:
        an uncompressed gasket thickness, and
        at least one aperture extending through the thickness of the gasket; and
    at least one insert made from a compressible material positioned within the at least one aperture,
    wherein the at least one insert has a second durometer, the second durometer being harder than the first durometer, and
    wherein the at least one insert has an insert thickness, the insert thickness being less than the uncompressed gasket thickness,
    wherein the at least one insert is capable of fitting entirely within the at least one aperture.

8. The entryway sealing spacer of claim 7, wherein the gasket further comprises an adhesive present along one face of the gasket.

9. The entryway sealing spacer of claim 7, wherein the gasket comprises a plurality of apertures, and further comprising a plurality of inserts respectively positioned in the plurality of apertures.

10. The entryway sealing spacer of claim 7, wherein the gasket has a perimeter shape substantially similar to a profile of a door sill.

11. The entryway sealing spacer of claim 10, wherein the gasket comprises a deck region and a threshold cap region.

12. The entryway sealing spacer of claim 7, wherein the gasket and the at least one insert do not overlap along the thickness direction.

13. An entryway, comprising:
    a first entryway component selected from the group consisting of a side jamb, a header, a mullion, a door sill, an astragal, and a threshold cap;
    a second entryway component selected from the group consisting of a side jamb, a header, a mullion, a door sill, an astragal, and a threshold cap; and
    an entryway sealing spacer according to claim 7 disposed between the first entryway component and the second entryway component.

14. The entryway of claim 13, wherein the first entryway component is a door sill and the second entryway component is a side jamb.

15. A gasket, comprising
    a sealing portion formed of a first compressible material having an uncompressed gasket thickness; and
    a control portion formed of a second compressible material, the control portion being less compressible than the sealing portion, the control portion having a perimeter surface forming an edge of first and second exposed surfaces, the first and second exposed surfaces being opposite one another, the perimeter surface being surrounded by the sealing portion, a thickness of the control portion being defined in a direction orthogonal to the first and second exposed surfaces is less than the uncompressed gasket thickness of the sealing portion.

* * * * *